United States Patent
Konagaya

(10) Patent No.: US 6,891,646 B1
(45) Date of Patent: May 10, 2005

(54) IMAGE READING APPARATUS

(75) Inventor: Tatsuya Konagaya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/361,972

(22) Filed: Jul. 28, 1999

(30) Foreign Application Priority Data

Jul. 28, 1998 (JP) .......................................... 10-212803

(51) Int. Cl.$^7$ ............................................. H04N 1/04
(52) U.S. Cl. ...................... 358/487; 358/498; 358/475; 358/483; 358/496; 358/497; 358/506; 358/509
(58) Field of Search ................................ 358/487, 498, 358/506, 475, 509, 505, 484, 497, 496, 494, 474, 483, 514, 512; 348/96, 97; 250/513, 234–236, 208.1; 355/67, 71, 404, 402, 407, 408; 382/312, 319, 318

(56) References Cited

U.S. PATENT DOCUMENTS

| | | | | |
|---|---|---|---|---|
| 5,757,518 A | * | 5/1998 | Kashitani | 358/474 |
| 5,767,989 A | * | 6/1998 | Sakaguchi | 358/474 |
| 6,333,778 B1 | * | 12/2001 | Katakura et al. | 355/56 |
| 6,366,366 B1 | * | 4/2002 | Nakamura | 358/487 |

FOREIGN PATENT DOCUMENTS

| | | |
|---|---|---|
| JP | 07-095363 | 4/1995 |
| JP | 9-127619 | 5/1997 |
| JP | 10-73749 | 3/1998 |
| JP | 10-93778 | 4/1998 |
| JP | 10-162122 | 6/1998 |
| JP | 10-164323 | 6/1998 |

* cited by examiner

Primary Examiner—Cheukfan Lee
(74) Attorney, Agent, or Firm—Sughrue Mion, PLLC

(57) ABSTRACT

The present invention discloses an image reading apparatus which enables high-speed reading of an image transmitted through a transparent material such as a photographic film or an image reflected by a reflective material. In the image reading apparatus, a transparent material such as a photographic film is first conveyed in a conveying direction thereof, and an image frame to be read is positioned at a reading position. After the image frame is positioned, light emitted from a lamp is made into slit light by a light diffusion box, a longitudinal direction of the slit light coinciding with the conveying direction of the photographic film, and the slit light is irradiated on a portion (line) to be read of the photographic film. Light transmitted through the portion of the photographic film is imaged by a lens unit onto a light-receiving surface of a line CCD (a reading sensor) which is disposed along the longitudinal direction of the photographic film. The photographic film is moved by sub-scanning means in a direction substantially perpendicular to the direction the photographic film is conveyed, and the position of a subsequent portion (line) to be read is determined. In this way, an image recorded on the photographic film is read line by line along a longitudinal direction of the image frame.

16 Claims, 12 Drawing Sheets

IMAGE READING APPARATUS

BACKGROUND OF THE INVENTION

1. Field of the Invention

The present invention relates to an image reading apparatus, and particularly to an image reading apparatus which reads an image recorded on a transparent material, such as a photographic film, or a reflective material.

2. Description of the Related Art

A conventional image reading apparatus is known in which an image recorded on a photographic film is read by transmitting light, which is emitted from a light source, through the transparent photographic film and photoelectrically reading the transmitted light using a reading sensor such as a line CCD.

This kind of image reading apparatus is structured in such a manner that, while a photographic film is conveyed in the longitudinal direction thereof, light emitted from the light source is irradiated through a light diffusion box on the photographic film as slit light which is elongated in the transverse direction of the photographic film, and the image transmitted through the photographic film is read line by line, by a line CCD or the like, in which a plurality of light-receiving cells are disposed in the transverse direction of the photographic film.

In general, an image frame of a photographic film has long sides in the longitudinal direction of the photographic film. In other words, the photographic film is conveyed in the direction of the long sides of the image frame. Therefore, a drawback arises in that reading of images recorded on the photographic film becomes inevitably slow when the line CCD is disposed along the transverse direction of the photographic film, i.e., along the direction of the short sides of the image frame.

SUMMARY OF THE INVENTION

In order to overcome the above-described drawback, an object of the present invention is to provide an image reading apparatus in which reading of an image, which is transmitted through a transparent material such as a photographic film or is recorded on a reflective material, can be effected at high speed.

In order to achieve the object, a first aspect of the present invention is an image reading apparatus comprising: a light source for irradiating light on an elongate transparent material which allows transmission of light; diffusing means for diffusing light emitted from the light source; conveying means for conveying the transparent material in a longitudinal direction of the transparent material; an imaging lens for imaging light which has been diffused by the diffusion means and transmitted through the transparent material; a reading sensor for effecting main scan in a longitudinal direction of the slit light, the reading sensor including a plurality of light-receiving cells provided along the longitudinal direction of the slit light for receiving light imaged by the imaging lens; and sub-scanning means for effecting sub-scan in a direction substantially perpendicular to a direction the transparent material is conveyed.

In the structure of the present invention described above, the elongate transparent material such as a photographic film is conveyed by the conveying means in the longitudinal direction of the transparent material, and a reading position of an image frame to be read is positioned at a position which corresponds to the light source and the reading sensor.

Light emitted from the light source is diffused by the diffusing means. Light diffused by the diffusing means and irradiated on the transparent material is transmitted through the transparent material and imaged by the imaging lens. Light imaged by the imaging lens is received by the reading sensor so as to effect main scan in the longitudinal direction of the slit light. The reading sensor is provided with a number of light-receiving cells disposed along the longitudinal direction of the slit light.

In this way, one line of the image frame is read in the longitudinal direction (in the direction of the long sides) thereof. Subsequently, the transparent material is sub-scanned (moved) by the sub-scanning means in a direction substantially perpendicular to the direction the transparent material is conveyed, and the subsequent line of the image frame in the longitudinal direction thereof is subjected to main scan in a similar manner.

A transparent material such as a photographic film can be used as the image recording material. In this case, light irradiated on the image recording material passes through the image recording material. In addition, the image recording material is not limited to a transparent material, and a reflective material such as copy paper can also be used. An image recording material in which are combined both a transparent material and a reflective material, for example, a watermark material, can also be used. When a reflective material is used, light irradiated on the image recording material is reflected by the image recording material. The main-scanning means of the present invention effects main scan, in the longitudinal direction of the image recording material, of light transmitted through or reflected by the image recording material. Namely, an image recorded on the image recording material is read line by line in the direction of the long sides of the image.

In a second aspect of the present invention, the sub-scanning means is moving means which moves the transparent material in a direction substantially perpendicular to the direction the transparent material is conveyed (i.e., the transverse direction of the elongate transparent material).

In the second aspect of the present invention, the sub-scanning means effects sub-scan in the direction substantially perpendicular to the direction the image recording material is conveyed, i.e., in the direction of the short sides of the image recording material. Therefore, reading time of the image recording material can be reduced as compared with the case in which main scan is effected in the direction of the short sides of the image recording material while sub-scan is effected in the direction of the long sides of the image recording material.

In a third aspect of the present invention, the sub-scanning means is moving means which moves the reading sensor, the imaging lens, and the shaping means in the direction substantially perpendicular to the direction the transparent material is conveyed.

In a fourth aspect of the present invention, light emitted from the light source is diffused by a diffusing means. Accordingly, the amount of light which is irradiated on the image recording material can be made uniform.

In a fifth aspect of the present invention, the sub-scanning means can be formed as the moving means which moves at least the reading sensor and the imaging lens in the direction substantially perpendicular to the direction the image recording material is conveyed. In this case, the image recording material is not moved, and instead, the reading sensor and the imaging lens are moved in the same direction synchronously with each other.

In a sixth aspect of the present invention, the diffusing means can be structured so as to make light emitted from the light source into slit light which is long along the longitudinal direction of the image recording material. With this structure, the density of light irradiated onto the reading position of the image recording material can be increased. In this case, the sub-scanning means may be a moving means which moves at least the reading sensor, the imaging lens, and the diffusing means in the direction substantially perpendicular to the direction the image recording material is conveyed.

In a seventh aspect of the present invention, light guiding means for guiding light irradiated on the image recording material to the imaging lens can further be provided at the light-entering side of the imaging lens.

According to the seventh aspect of the present invention, the light guiding means guides light irradiated on the image recording material to the light-entering side of the imaging lens. For example, at least one mirror can be used as the light guiding means. A prism can also be used as the light guiding means.

For example, by using one mirror, light irradiated on the image recording material can be reflected in the direction substantially perpendicular to the direction the image recording material is conveyed, so as to be made to enter the imaging lens. In this case, the sub-scanning means can be a moving means which moves the reading sensor, the imaging lens, and the light guiding means in the direction substantially perpendicular to the direction the image recording material is conveyed. In other words, by moving the reading sensor, the imaging lens, and the light guiding means in the direction substantially perpendicular to the direction the image recording material is conveyed, sub-scan can be effected without moving the image recording material.

Further, when a combination of mirrors is used to guide light irradiated on the image recording material to the imaging lens, an image imaged by the imaging lens can be moved in the sub-scan direction by appropriately moving the respective mirrors in the direction substantially perpendicular to the direction the image recording material is conveyed. Accordingly, sub-scan can be effected without moving the image recording material, the imaging lens, and the reading sensor.

In an eighth aspect of the present invention, the sub-scanning means according to the seventh aspect can be formed as driving means which rotates the light guiding means.

According to the eighth aspect, when one mirror is used as the light guiding means, for example, an image imaged by the imaging lens can be moved in the sub-scan direction by rotating the mirror. Therefore, sub-scan can be effected without moving the image recording material, the imaging lens, and the reading sensor.

According to each of the above-described aspects of the present invention, since the reading sensor is disposed in the direction of the long sides of the image frame, the image frame can be subjected to main scan in the longitudinal direction thereof while being sub-scanned (moved) in the transverse direction thereof. Accordingly, reading time of the image frames can be greatly reduced as compared with the prior art in which the reading sensor is disposed in the direction of the short sides of the image frame. In short, in the present invention, by disposing the reading sensor along the direction the transparent material is conveyed, the time used for sub-scan of the transparent material is greatly shortened in a case in which the transparent material is conveyed in the direction of the long sides of the image frame (a photographic film, for example), and thus reading of images can be effected at high speed.

DESCRIPTION OF THE PREFERRED EMBODIMENTS

Referring to the attached drawings, a preferred embodiment of the present invention will be hereinafter described in detail.

Figure 1:
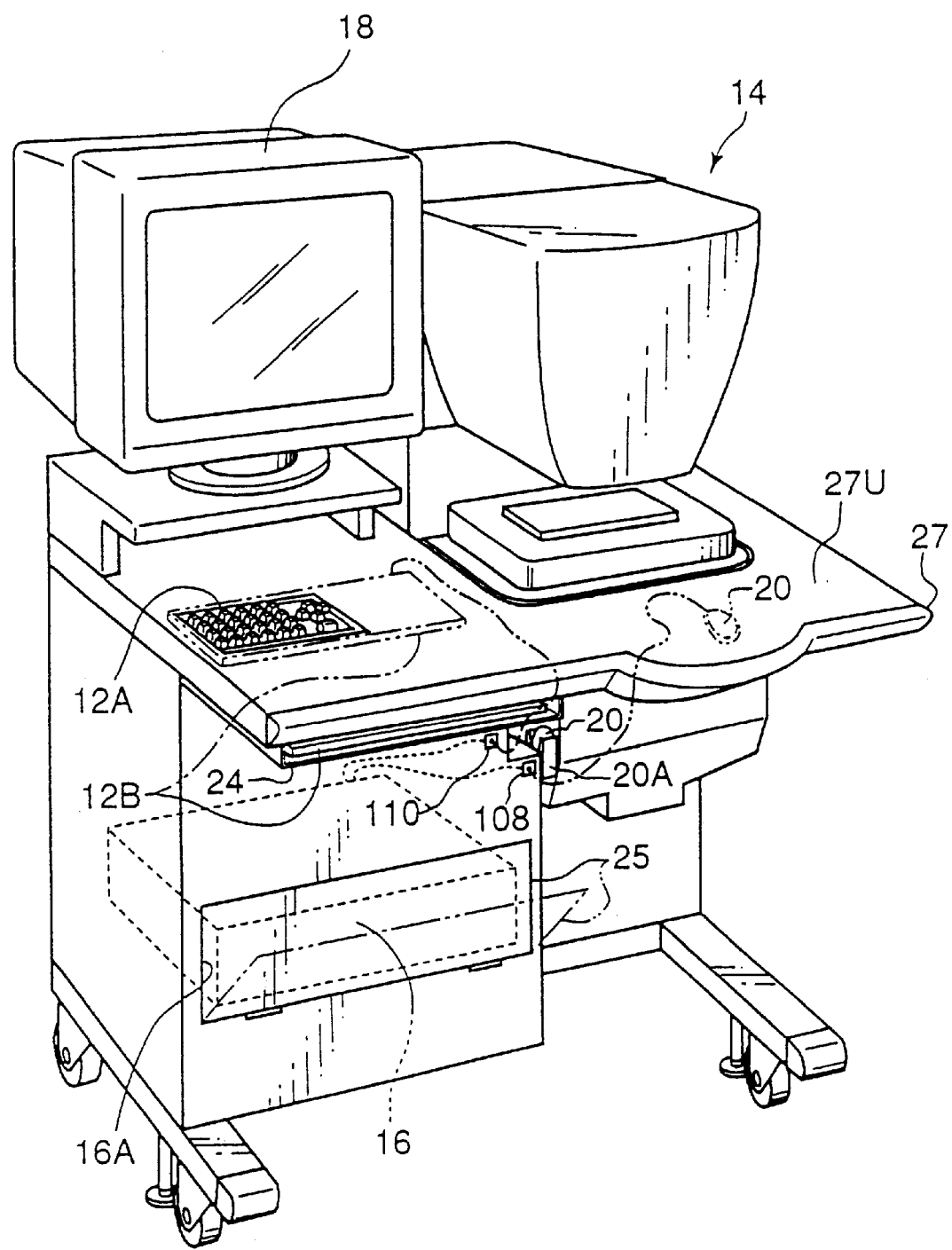
FIG. 1 is an outside view of a line CCD scanner.

As shown in FIG. 1, a line CCD scanner 14 according to the present embodiment is provided at a work table 27, which is equipped with an image processing section 16, a mouse 20, two types of keyboards 12A and 12B, and a display 18.

One of the keyboards, the keyboard 12A, is embedded in a work surface 27U of the work table 27. When not in use, the other keyboard, the keyboard 12B, is accommodated within a drawer 24 of the work table 27, and when in use, the keyboard 12B is taken out of the drawer 24 and is laid on the one keyboard 12A. At this time, the cord of the keyboard 12B is connected to a jack 110 which is connected to the image processing section 16.

The cord of the mouse 20 is connected through a hole 108, which is provided at the work table 27, to the image processing section 16. When not in use, the mouse 20 is accommodated within a mouse holder 20A, and when in use, the mouse 20 is taken out of the mouse holder 20A and is placed on the work surface 27U.

The image processing section 16 is accommodated within an accommodating portion 16A provided at the work table 27, and is tightly shielded from the exterior by a door 25. The image processing section 16 can be taken out of the accommodating portion 16A by opening the door 25.

The line CCD scanner 14 is used to read a film image recorded on a photographic film such as a negative film or a reversal film. Examples of the photographic film of which a film image can be read include a 135-size photographic film, a 110-size photographic film, and a photographic film with a transparent magnetic layer formed thereon (i.e., a 240-size photographic film: so-called APS film), and 120-size and 220-size photographic films (Brownie size). The line CCD scanner 14 reads the film image to be read, as described above, by a line CCD and outputs image data.

The photographic film mentioned herein refers to the film which is subjected to developing processing such that negative images or positive images formed on the film are made visible after an object has been photographed.

The image processing section 16 is structured to allow input of image data outputted from the line CCD scanner 14. Further, the image processing section 16 effects image processing including various corrections for the input image data and then outputs the corrected image data, as recording image data, to an unillustrated laser printer section.

Figure 2:
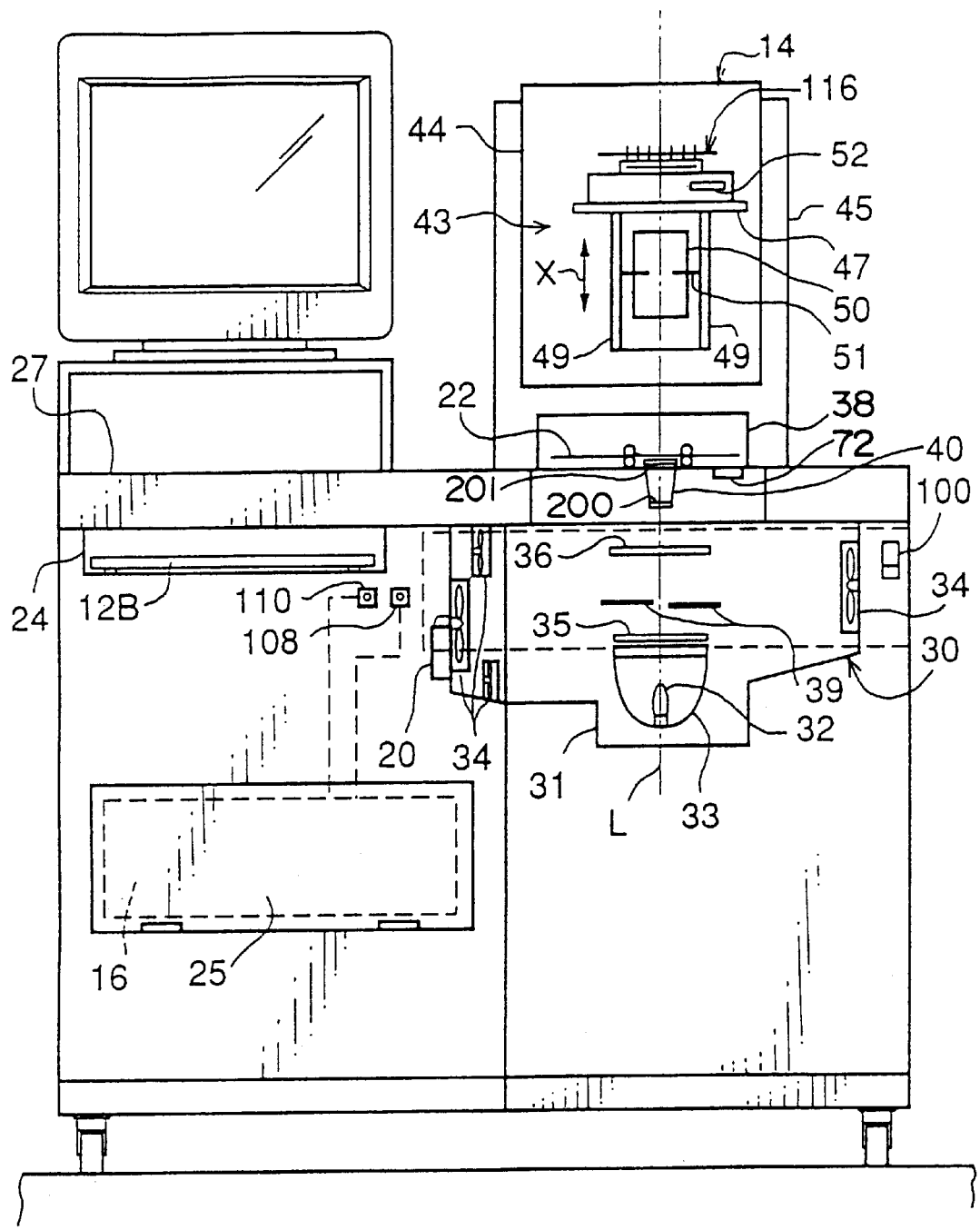
FIG. 2 is a front sectional view of an optical system of the line CCD scanner.
Figure 3:
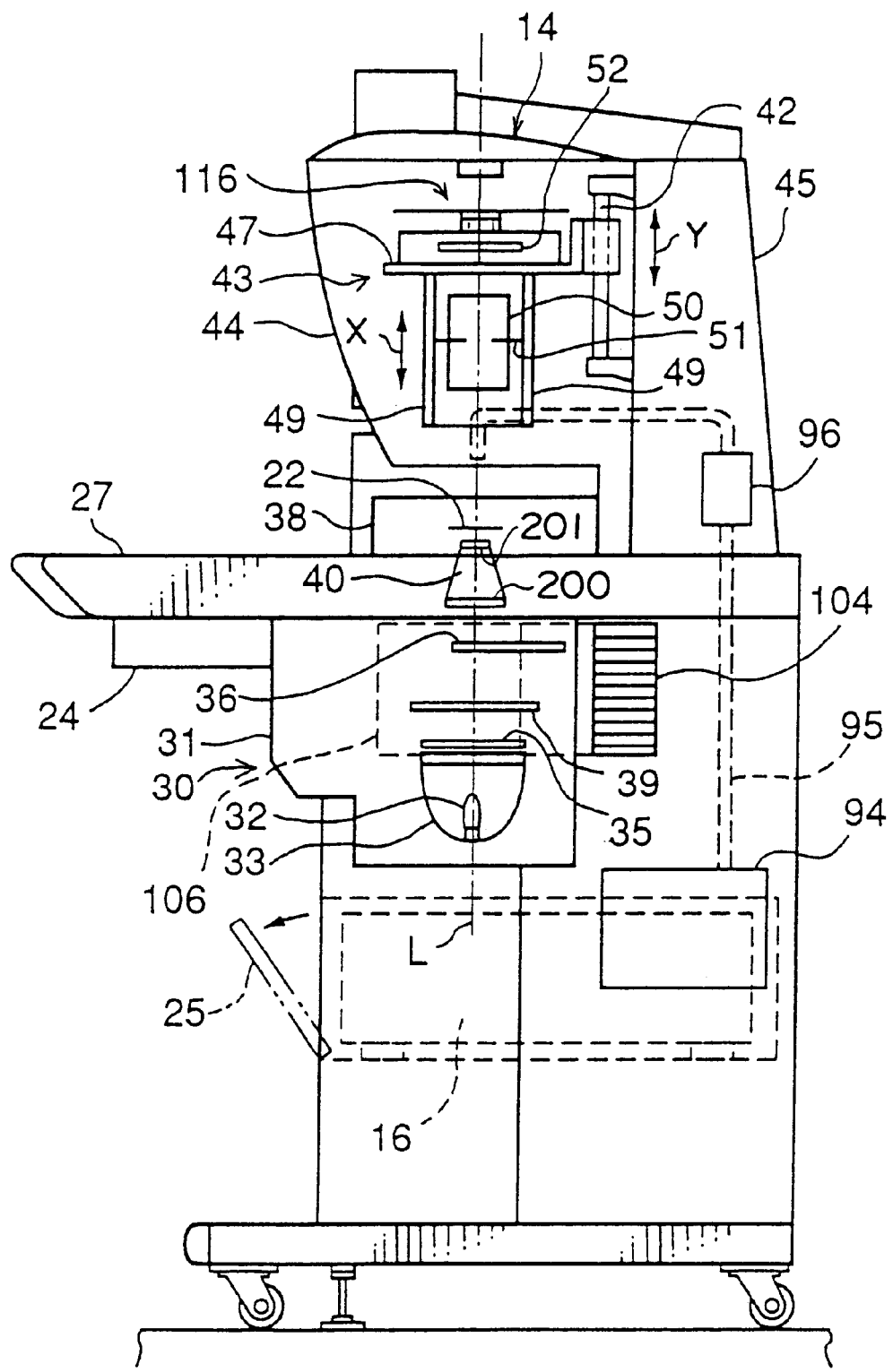
FIG. 3 is a side sectional view of the optical system of the line CCD scanner.

As shown in FIGS. 2 and 3, an optical system of the line CCD scanner includes a light source section 30 disposed below the work table 27, a light diffusion box 40 supported by the work table 27, a film carrier 38 set on the work table 27, and a reading section 43 disposed at the side of the work table 27 opposite to the side at which the light source section 30 is disposed.

The light source section 30 is accommodated within a metallic casing 31. A lamp 32 comprised of a halogen lamp, a metal halide lamp, or the like is disposed within the casing 31.

A reflector 33 is provided at the periphery of the lamp 32, and a portion of light emitted from the lamp 32 is reflected by the reflector 33 in a fixed direction. A plurality of fans are provided on the sides of the reflector 33. The fans 34 are operated when the lamp 32 is turned on, so as to prevent overheating of the interior of the casing 31.

A UV/IR cutting filter 35, a diaphragm 39, and a turret 36 (see also FIG. 4B) are sequentially provided on the light emission side of the reflector 33 along an optical axis L of light reflected by the reflector 33. The UV/IR cutting filter 35 cuts light having wavelengths in the ultraviolet and infrared regions and so prevents chemical reactions and an increase in the temperature of the photographic film 22, such that a high reading accuracy is ensured. The diaphragm 39 adjusts the amount of light from the lamp 32 and the reflector 33. The turret 36 has a balance filter 36N for a negative film and a balance filter 36P for a reversal film fitted therein. In accordance with the type of the photographic film (a negative film/a reversal film), the turret 36 appropriately sets color components of the light which reaches the photographic film 22 and a reading section 43.

Figure 4A:
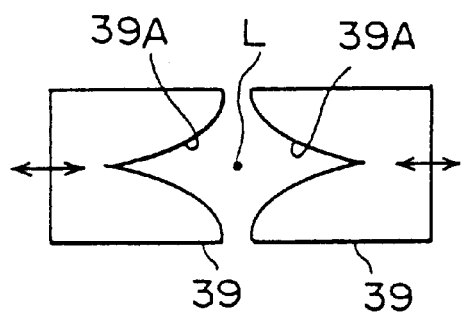
FIG. 4A is a plan view which shows a diaphragm included in the optical system of the line CCD scanner shown in FIG. 3.

The diaphragm 39 is formed from a pair of plate-like members with the optical axis L interposed therebetween and is provided to move slidably so that the pair of plate-like members move toward and away from each other. As shown in FIG. 4A, the pair of plate-like members of the diaphragm 39 each has a notch 39A formed at one end of the plate-like member from the one end toward the other end in the direction the diaphragm 39 is slid so that the cross-sectional area of the plate-like member along the direction perpendicular to the sliding direction continuously varies. These plate-like members are disposed in such a manner that the sides thereof with the notches 39A formed therein face each other.

In the above-described structure, either of the filters (36N, 36P) is disposed on the optical axis L in accordance with the type of the photographic film so as to form light having desired light components. The amount of light passing through the diaphragm 39 is adjusted to a desired amount of light by the position of the diaphragm 39.

Figure 7:
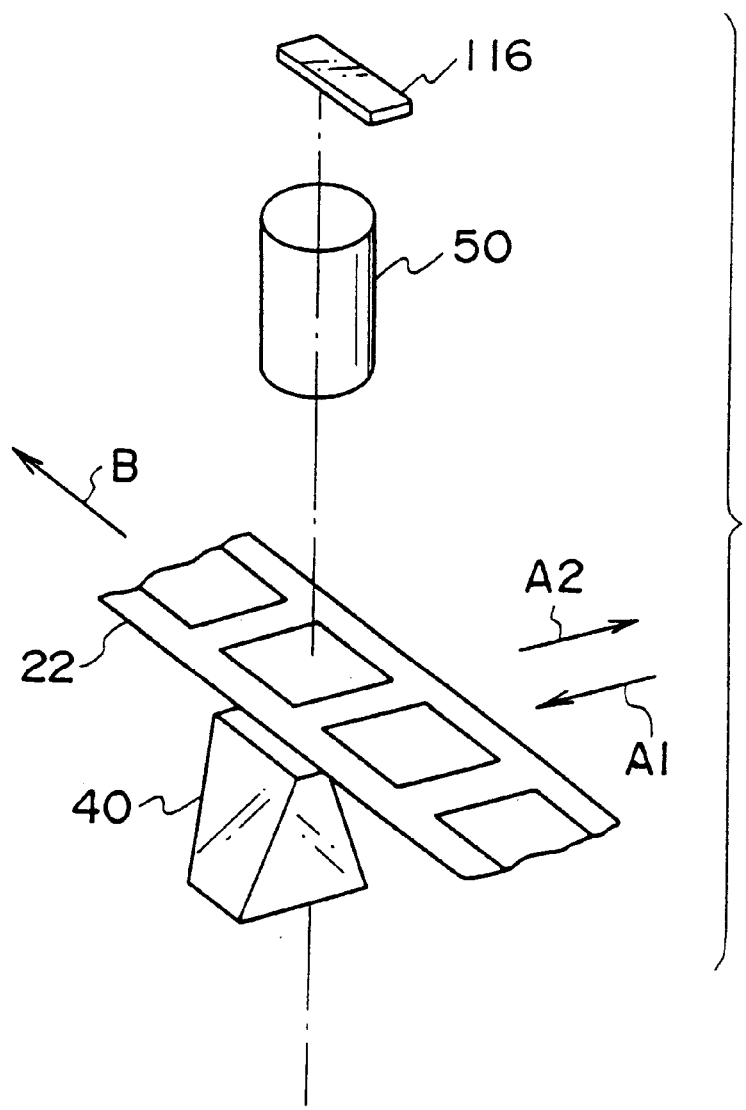
FIG. 7 is a view which solely shows a principal portion of FIG. 5.

The light diffusion box 40 is formed in such a manner that, closer to the upper portion thereof, i.e., toward the photographic film 22, the light diffusion box 40 is made longer in the direction the photographic film 22 is conveyed by the film carrier 38 (see FIGS. 2 and 7) and is made shorter in the direction perpendicular to the direction the photographic film 22 is conveyed (i.e., the transverse direction of the photographic film 22)(see FIGS. 3 and 7). Further, light diffusion plates 200 and 201 are mounted on the light-entering side and the light-exiting side of the light diffusion box 40, respectively. Although the aforementioned light diffusion box 40 is used for a 135-size photographic film, light diffusion boxes formed in accordance with other types of photographic films (now shown) are also prepared.

Light entering the light diffusion box 40 is, toward the film carrier 38 (i.e., the photographic film 22), made into slit light whose longitudinal direction coincides with the direction the photographic film 22 is conveyed, and further is made into diffused light by the light diffusion plates 200 and 201, and then exits the light diffusion box 40. Due to light exiting from the light diffusion box being made into diffused light as described above, nonuniformity in the amount of light irradiated on the photographic film 22 is alleviated and a uniform amount of slit light is illuminated onto the film image. Further, even when scratches are present on the film image, the scratches are prevented from becoming conspicuous.

A film carrier 38 and a light diffusion box 40 are provided for each type of the photographic film 22 and selected in accordance with the type of the photographic film 22.

An elongate opening (not shown) is provided at respective positions of the top surface and the bottom surface of the film carrier 38, which positions correspond to the optical axis L. The opening is designed to be longer than the long sides of an image frame of the photographic film 22 in the conveying direction thereof. Slit light from the light diffusion box 40 is irradiated on the photographic film 22 through the opening provided in the bottom surface of the film carrier 38 and then reaches the reading section 43 through the opening provided in the top surface of the film carrier 38.

Further, the light diffusion box 40 is supported such that the top surface thereof is near the above-mentioned reading position. Therefore, a cut-out portion is provided at the bottom surface of the film carrier 38 so that the film carrier 38 and the light diffusion box 40 do not interfere with each other when the film carrier 38 is loaded.

The film carrier 38 is structured so as to be capable of conveying the photographic film 22 at various speeds in accordance with the density or other conditions of a film image to be scanned at the time of fine scan or pre-scan.

Further, in FIG. 7, the film carrier 38 not only conveys the photographic film 22 in the direction indicated by arrow B, but also moves the photographic film 22 in the directions indicated by arrows A1 and A2.

The reading section 43 is accommodated within a casing 44. A loading stand 47, on the upper surface of which a line CCD 116 is mounted, is provided within the casing 44 and a plurality of lens cylinders 49 hang down from the loading stand 47. In order to carry out a change of magnification such as reduction, enlargement or the like, a lens unit 50 is supported by the lens cylinders 49 in such a manner that the lens unit 50 can be moved slidably in the directions X toward and away from the work table 27.

A supporting frame 45 is formed upright on the work table 27. The loading stand 47 is supported by a guide rail 42 mounted to the supporting frame 45 in such a manner as to move slidably in the directions Y in which the loading stand 47 moves toward and away from the work table 27 so that a conjugate length can be ensured during the above-described change of magnification or automatic focusing.

The lens unit 50 is comprised of a plurality of lenses, and an aperture stop (lens diaphragm) 51 is provided among these lenses.

Figure 4B:
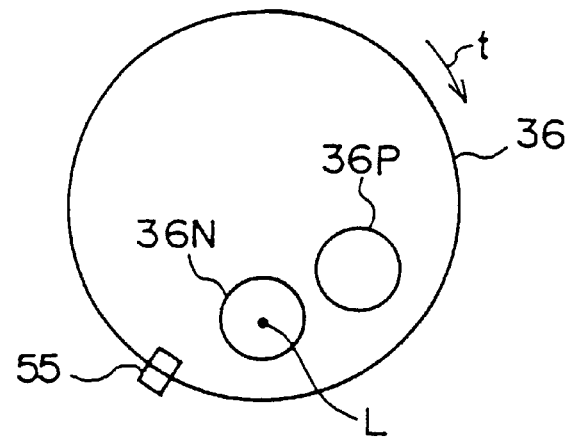
FIG. 4B is a plan view which shows a turret included in the optical system of the line CCD scanner shown in FIG. 3.
Figure 4C:
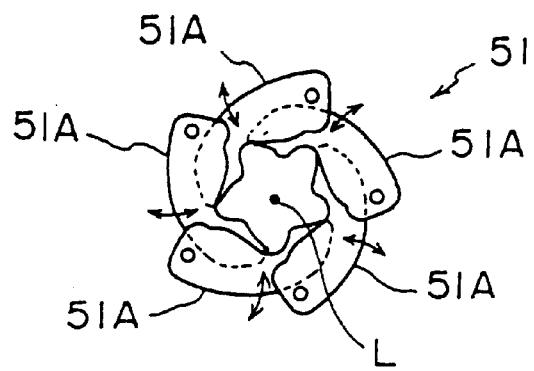
FIG. 4C is a plan view which shows an example of an aperture stop included in the optical system of the line CCD scanner shown in FIG. 3.

As shown in FIG. 4C, the aperture stop 51 includes a plurality of diaphragm plates 51A each having a substantially C-shaped configuration. These diaphragm plates 51A are disposed evenly around the optical axis L and one end portion of each of the diaphragm plates 51A is supported by a pin so that the diaphragm plates 51A are each rotatable around the pin. The plurality of diaphragm plates 51A are connected together via a link (not shown), and when driving force of a lens diaphragm driving motor (which will be described later) is transmitted to the diaphragm plates 51A, the diaphragm plates 51A rotate in the same direction. Accompanied with the rotation of the diaphragm plates 51A, an area around the optical axis L which is not cut off from light by the diaphragm plates 51A (a substantially star-shaped area shown in FIG. 4C) varies and the amount of light transmitted through the aperture stop 51 thereby varies.

A line CCD 116 is structured in such a manner that a sensing portion, in which a large number of photoelectric conversion elements such as CCD cells or photodiodes are disposed in a row in the conveying direction of the photographic film 22 (in the direction indicated by arrow B in FIG. 7) and an electronic shutter mechanism is disposed, is provided in each of three parallel lines which are spaced apart from each other and color separation filters of R, G, and B respectively are mounted on the light-incident side of the sensing portions (i.e., the line CCD 116 is a so-called three-line color CCD).

Figure 8:
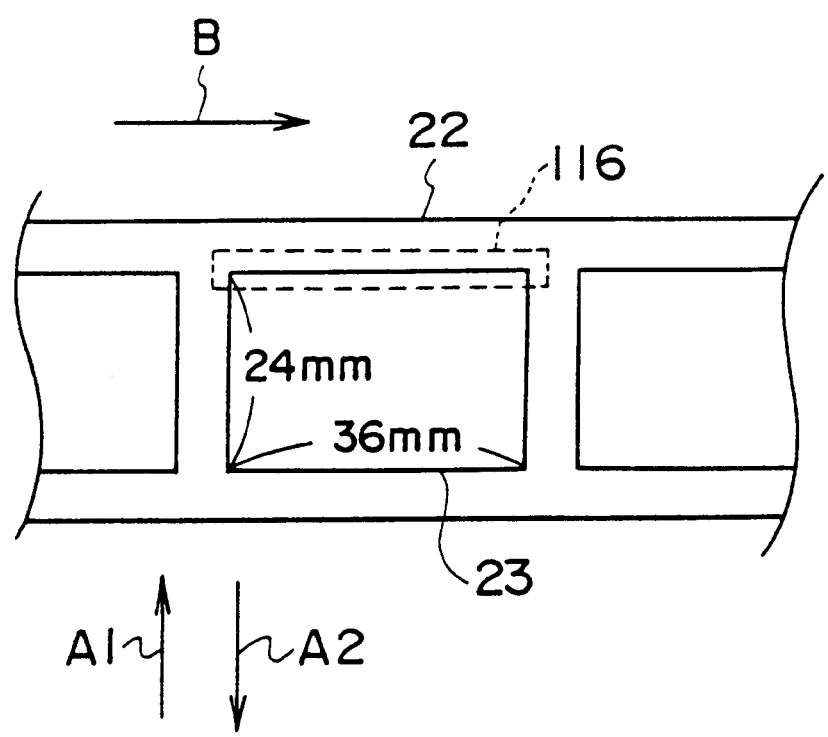
FIG. 8 is a plan view which shows a photographic film to be conveyed, together with arrows indicating respective directions in which the photographic film is conveyed (A1, A2, and B).

As shown in FIG. 8, the line CCD 116 has a length which is longer than the long sides of an image frame of the photographic film 22 and yet does not extend over the adjacent image frames. For example, in the case of a 135-size photographic film, an image frame 23 has a long side of 36 mm and a short side of 24 mm, as shown in FIG. 8. Accordingly, the length of the line CCD 116 needs to be equal to or more than 36 mm, and in the present embodiment, the length of the line CCD 116 is 40 mm, as an example.

In brief, in the present embodiment, after the photographic film 22 is conveyed by the film carrier 38 in the direction indicated by arrow B in the Figures and is positioned at the reading position, i.e., the top portion of the image frame shown in FIG. 8, the film carrier 38 moves the photographic film 22 line by line in the direction indicated by arrow A1 in the Figures as the sub-scan, such that the line CCD 116 can read line by line along the direction of the long sides of the image frame 23 an image recorded on the image frame 23.

Further, a plurality of transfer portions are provided in the vicinity of each of the sensing portions so as to correspond to the respective sensing portions. The charge accumulated in each of the CCD cells of each sensing portion is sequentially transferred via the corresponding transfer portion.

Figure 4D:
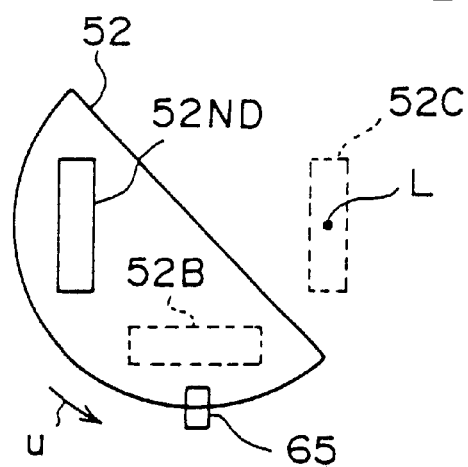
FIG. 4D is a plan view which shows an example of a CCD shutter included in the optical system of the line CCD scanner shown in FIG. 3.

Further, a CCD shutter 52 is provided on the light-incident side of the line CCD 116. As shown in FIG. 4D, an ND filter 52ND is fitted into the CCD shutter 52.

The CCD shutter 52 is rotated in the direction indicated by arrow u so as to allow switching between a completely closed state in which light otherwise made incident on the line CCD 116 is blocked for dark correction (i.e., a portion 52B or the like, in which the ND filter 52ND is not fitted, is positioned at a position 52C including the optical axis L), a completely open state in which light is made incident on the line CCD 116 for normal reading or light correction (i.e., the position shown in FIG. 4D), and a reduced light state in which light to be made incident on the line CCD 116 is decreased by the ND filter 52ND for linearity correction (i.e., the ND filter 52ND is positioned at the position 52C).

As shown in FIG. 3, a compressor 94 is provided at the work table 27. The compressor 94 generates cooling air for cooling the photographic film 22.

Cooling air generated by the compressor 94 is guided by a guiding pipe 95 and supplied to an unillustrated reading portion of the film carrier 38. As a result, an area of the photographic film 22 which is positioned at the reading portion can be cooled. The guiding pipe 95 passes through a flow rate sensor 96 which detects the flow rate of cooling air.

Figure 5:
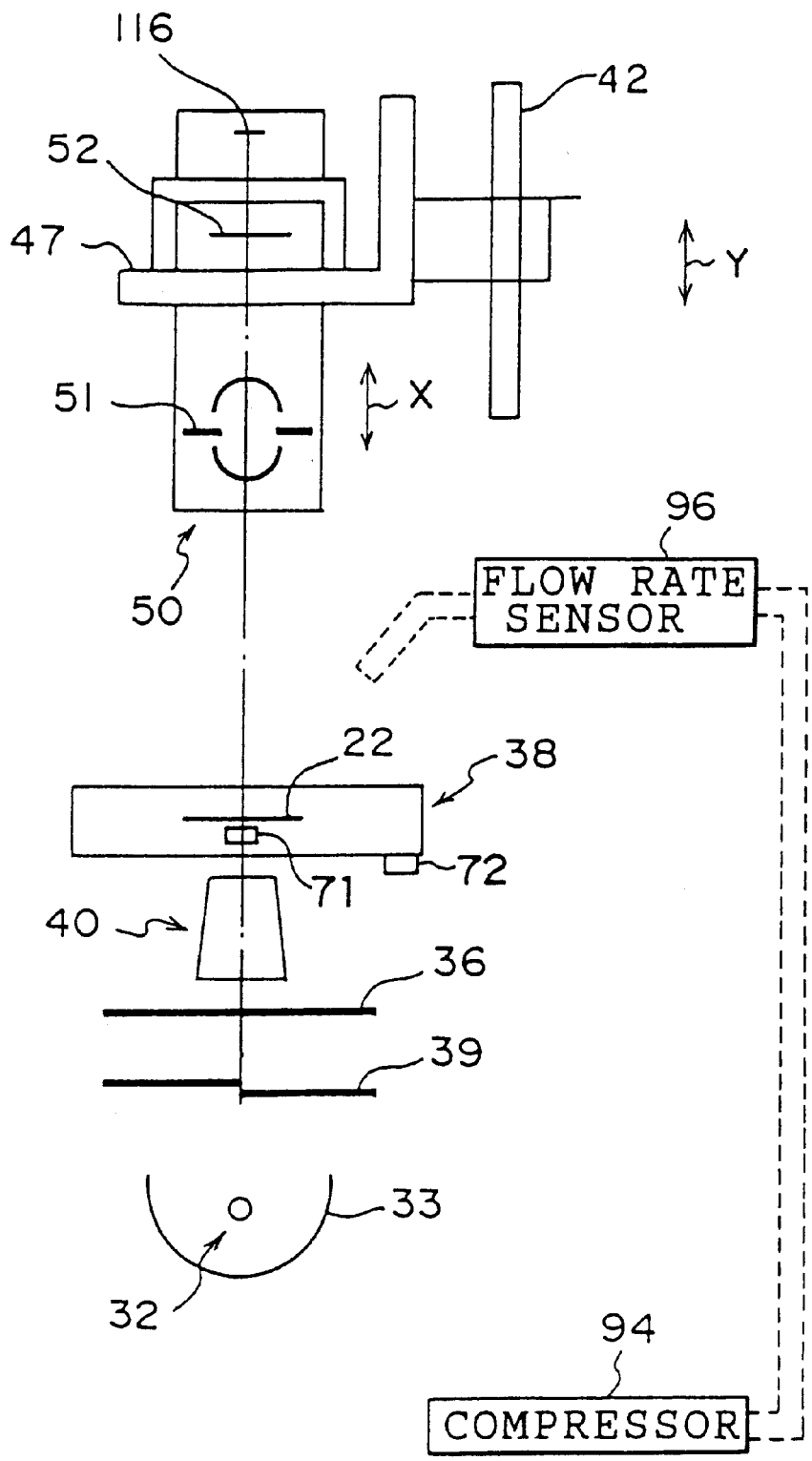
FIG. 5 is a view which solely shows a principal portion of the optical system of the line CCD scanner.
Figure 6:
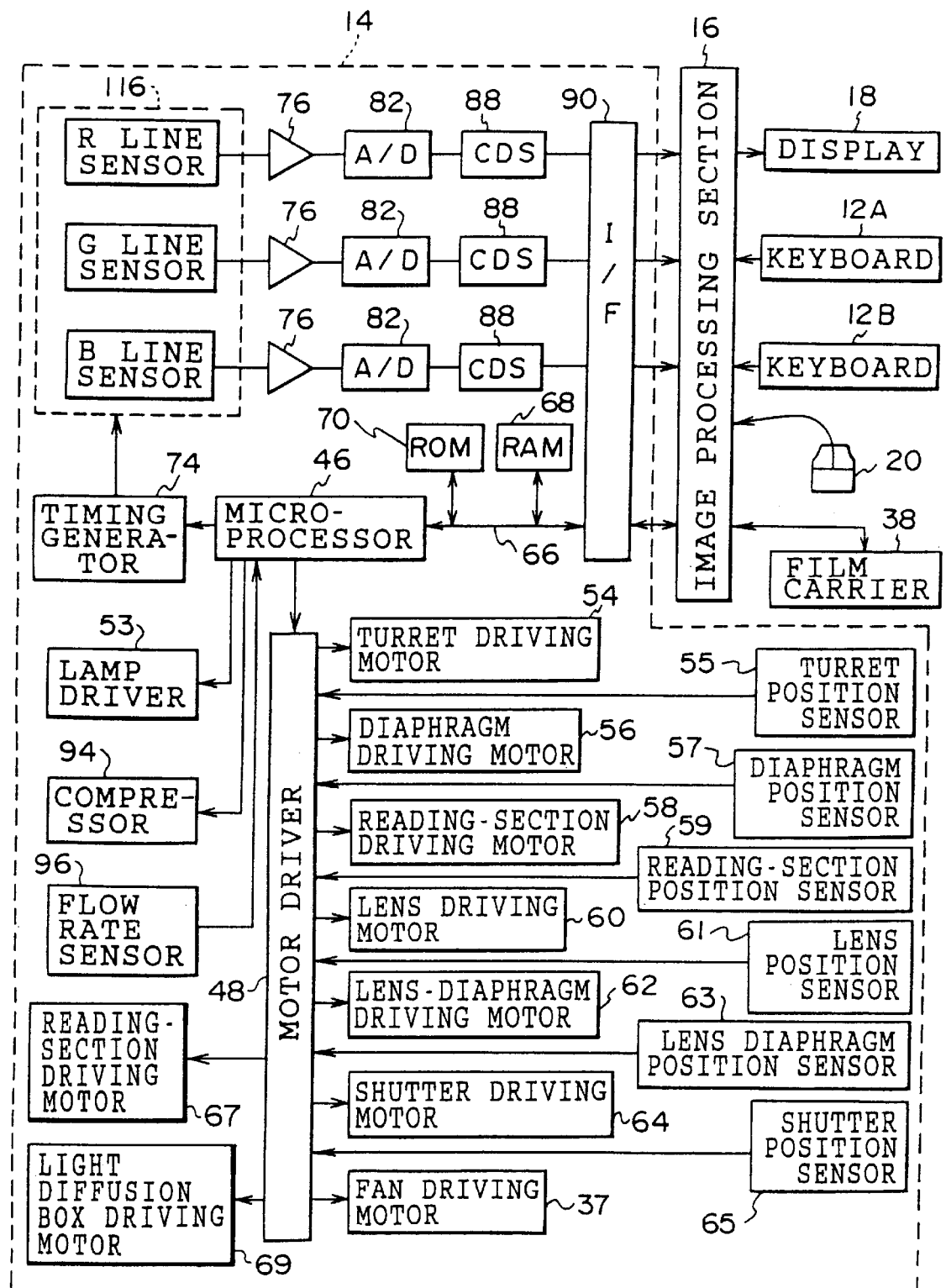
FIG. 6 is a block diagram which schematically shows the structure of an electric system of the line CCD scanner.

Referring to a principal portion of the optical system of the line CCD scanner 14 shown in FIG. 5, a schematic structure of an electric system of the line CCD scanner 14 and the image processing section 16 will be described using FIG. 6.

The line CCD scanner 14 includes a microprocessor 46 which effects control of the entire line CCD scanner 14.

A RAM 68 (for example, a SRAM), a ROM 70 (for example, a ROM which can rewrite the stored content) are connected via a bus 66 to the microprocessor 46, and a lamp driver 53, the compressor 94, the flow rate sensor 96, and a motor driver 48 are also connected to the microprocessor 46.

The lamp driver 53 turns a lamp 32 on and off in accordance with an instruction from the microprocessor 46. Further, at the time of reading a film image of the photographic film 22, the microprocessor 46 operates the compressor 94 to supply cooling air to the photographic film 22. The flow rate of cooling air is detected by the flow rate sensor 96, and the microprocessor 46 detects, if any, abnormalities.

Further, a turret driving motor 54 and a turret position sensor 55 (see FIG. 4B also) are connected to a motor driver 48. The turret driving motor 54 drives to rotate the turret 36 in the direction indicated by arrow t in FIG. 4B so that either of the balance filter 36N for negative films and the balance filter 36P for reversal films of the turret 36 is positioned on the optical axis L. The turret position sensor 55 detects the base position (an unillustrated notch) of the turret 36.

Also connected to the motor driver 48 are a diaphragm driving motor 56, a diaphragm position sensor 57, a reading-section driving motor 58, a reading-section driving motor 67, a reading-section position sensor 59, a lens driving motor 60, a lens position sensor 61, a lens diaphragm driving motor 62, a lens diaphragm position sensor 63, a shutter driving motor 64, a shutter position sensor 65, a fan driving motor 37, and a light diffusion box driving motor 69. The diaphragm driving motor 56 allows sliding movement of the diaphragm 39, and the diaphragm position sensor 57 detects the position of the diaphragm 39. The reading-section driving motor 58 allows sliding movement of the loading stand 47 (i.e., the line CCD 116 and the lens unit 50) along the guide rail 42. The reading-section driving motor 67 moves the loading stand 47 in the directions substantially perpendicular to the direction the photographic film 22 is conveyed, i.e., moves the loading stand 47 in the directions indicated by arrows A1 and A2 in FIG. 7. The reading-section position sensor 59 detects the position of the loading stand 47. The lens driving motor 60 allows sliding movement of the lens unit 50 along the lens cylinders 49, and the lens position sensor 61 detects the position of the lens unit 50. The lens diaphragm driving motor 62 allows rotation of the diaphragm plates 51A of the aperture stop 51, and the lens diaphragm position sensor 63 detects the position of the aperture stop 51 (i.e., the position of the diaphragm plates 51A). The shutter driving motor 64 allows switching between the completely closed state, the completely open state, and the reduced light state of the CCD shutter 52, and the shutter position sensor 65 detects the position of the shutter 52. The fan driving motor 37 drives the fans 34, and the light diffusion box driving motor 69 moves the light diffusion box 40 in the directions indicated by arrows A1 and A2 in FIG. 7.

During pre-scan (preliminary reading) and fine-scan (main reading) of the line CCD 116, based on the respective positions of the turret 36 and the diaphragm 39, which are respectively detected by the turret position sensor 55 and the diaphragm position sensor 57, the microprocessor 46 drives the turret driving motor 54 to rotate the turret 36 and drives the diaphragm driving motor 56 to slidably move the diaphragm 39, thereby allowing adjustment of light irradiated on a film image.

Further, the microprocessor 46 determines zoom magnification in accordance with the size of a film image or depending on whether trimming is to be effected, and allows sliding movement of the loading stand 47 by the reading-section driving motor 58 based on the position of the loading stand 47 detected by the reading-section position sensor 59 and further allows sliding movement of the lens unit 50 by the lens driving motor 60 based on the position of the lens unit 50 detected by the lens position sensor 61, so that the film image can be read by the line CCD 116 at the determined zoom magnification.

Further, when focusing control (automatic focusing control) is effected which allows the light-receiving surface of the line CCD 116 to coincide with an imaging position of the film image set by the lens unit 50, the microprocessor 46 allows sliding movement of only the loading stand 47 by the reading-section driving motor 58.

The focusing control can be effected so that, for example, the contrast of a film image read by the line CCD 116 becomes maximum (i.e., a so-called image contrast technique). Alternatively, the focusing control may also be effected based on a distance detected by a distance sensor instead of on film-image data, the distance sensor being provided to measure the distance between the photographic film 22 and the lens unit 50 (or the line CCD 116) by using infrared radiation or the like.

A timing generator 74 is connected to the line CCD 116. The timing generator 74 generates various timing signals (clock signals) for operating the line CCD 116, A/D converters 82, which will be described later, and the like. Signal output ends of the line CCD 116 are connected to the A/D converters 82 via amplifiers 76, and the signals outputted from the line CCD 116 are amplified by the amplifiers 76 and are converted to digital data in the A/D converters 82.

The output ends of the A/D converters 82 are each connected to the image processing section 16 via a correlated double sampling circuit (CDS) 88 and an interface (I/F) circuit 90 in that order. The CDS 88 effects sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in each of the CCD cells) are sequentially outputted, as scan image data, to the image processing section 16 via the I/F circuit 90.

Meanwhile, photometric signals of R, G, and B are outputted concurrently from the line CCD 116, and therefore, three signal processing systems each including the amplifiers 76, the A/D converters, and the CDSs 88 are provided and image data of R, G, and B are concurrently inputted, as scan image data, to the image processing section 16 from the I/F circuit 90.

Further, the display 18, the keyboard 12A and 12B, the mouse 20, and the film carrier 38, all of which were described above, are also connected to the image processing section 16.

Next, operation of the line CCD scanner 14 according to the present embodiment will be described.

When the power source of the line CCD scanner 14 is turned on, the microprocessor 46 turns on the lamp 32 and moves the diaphragm 39 to its completely closed position.

Further, when reading (pre-scan or fine-scan) of the photographic film 22 provided on the film carrier 38 is instructed by the image processing section 16, the respective positions of the diaphragm 39, the turret 36, the casing 44, the lens unit 50, the aperture stop 51, and the CCD shutter 52 are controlled in accordance with a reading condition transmitted concurrently with the instruction from the image processing section 16. Further, a charge accumulation time in the line CCD 116 is set for each color, and the photographic film 22 is conveyed by the film carrier 38 at a predetermined speed in the direction indicated by arrow B in FIGS. 7 and 8.

When an image frame to be read is conveyed to the reading position, more specifically, the position where the line at the uppermost portion of the image frame 23 can be read by the line CCD scanner 116, the film carrier 38 stops conveyance of the photographic film 22. Subsequently, the photographic film 22 is read line by line in the longitudinal direction thereof while being moved at a predetermined speed in the direction indicated by arrow A1 in FIG. 8.

Wavelengths in the ultraviolet and infrared regions of light emitted from the lamp 32 are cut off by the UV/IR cutting filter 35, and the amount of light irradiated on the film image is adjusted by the diaphragm 39 and the turret 36. Light entering the light diffusion box 40 is made into slit light whose longitudinal direction coincides with the direction the photographic film 22 is conveyed and is irradiated on a portion of the photographic film 22 which is located at the reading position.

Among light irradiated on the aforementioned portion of the photographic film 22, light transmitted through this portion is imaged by the lens unit 50 onto the light-receiving surface of the line CCD 116.

In response to the light imaged onto the light-receiving surface of the line CCD 116, each of the line sensors 116R, 116G, and 116B for each base color of the line CCD 116 outputs a signal having a level determined in accordance with the amount of incident light. The signals outputted respectively from the line sensors 116R, 116G, and 116B are amplified by the amplifiers 76 and converted to digital data in the A/D converters 82. After aberration (so-called color aberration) of a line read by each of the three lines of the line CCD 116 is corrected by the respective CDSs 88, data is outputted via the interface (I/F) circuit 90 to the image processing section 16.

In this way, while the photographic film 22 is moved in the direction indicated by arrow A1 in FIG. 8 (sub-scan), an image on the image frame 23 is read line by line (main scan) so as to be sequentially outputted to the image processing section 16. When reading of the image frame 23 is finished, the film carrier 38 moves the photographic film 22 in the direction indicated by arrow A2 in FIG. 8, i.e., in the direction opposite to that indicated by arrow A1, so as to return the photographic film 22 to its original position, and then conveys the photographic film 22 in the direction indicated by arrow B for reading of the subsequent image frame. Thereafter, reading of image frames are successively effected in a similar manner while the photographic film 22 is conveyed.

In this way, in the present embodiment, the line CCD 116 is disposed along the direction of the long sides of the image frame. Therefore, reading time of image frames in the case of a 135-size photographic film is reduced to $2/3$ (24 mm/36 mm=$2/3$), as compared with the conventional case in which the line CCD 116 is disposed along the direction of the short sides of the image frame.

In the present embodiment, although an exemplary case is described in which reading of images is effected by moving the photographic film 22 in the directions indicated by arrows A1 and A2 in FIG. 7, the present invention is not limited to the same. In place of moving the photographic film 22 in the directions indicated by arrows A1 and A2 in the Figures, the present invention may be structured such that the reading-section driving motor 67 and the light diffusion box driving motor 69 are driven synchronously so as to move the loading stand 47 (i.e., the line CCD 116 and the lens unit 50) and the light diffusion box 40 synchronously in the directions indicated by arrows A1 and A2 in the Figures.

Further, the present invention may be structured such that, for example, the photographic film 22 is moved in the direction indicated by arrow A1 and the loading stand 47 and the light diffusion box 40 are moved in the direction indicated by arrow A2 (i.e., the photographic film 22, on the one hand, and the loading stand 47 and the light diffusion box 40, on the other hand, are moved relative to one another).

Moreover, in the present embodiment, the light diffusion box 40 is structured so as to make the entering light into slit light whose longitudinal direction coincides with the direction the photographic film 22 is conveyed. However, this light is not limited to slit light, and the light diffusion box 40 may also be structured such that light entering the light diffusion box 40 is irradiated on the entire image frame of the photographic film 22. In this case, when sub-scan is effected without moving the photographic film 22, only the loading stand 47 needs to be moved, and it is not necessary to move the light diffusion box 40.

Figure 9:
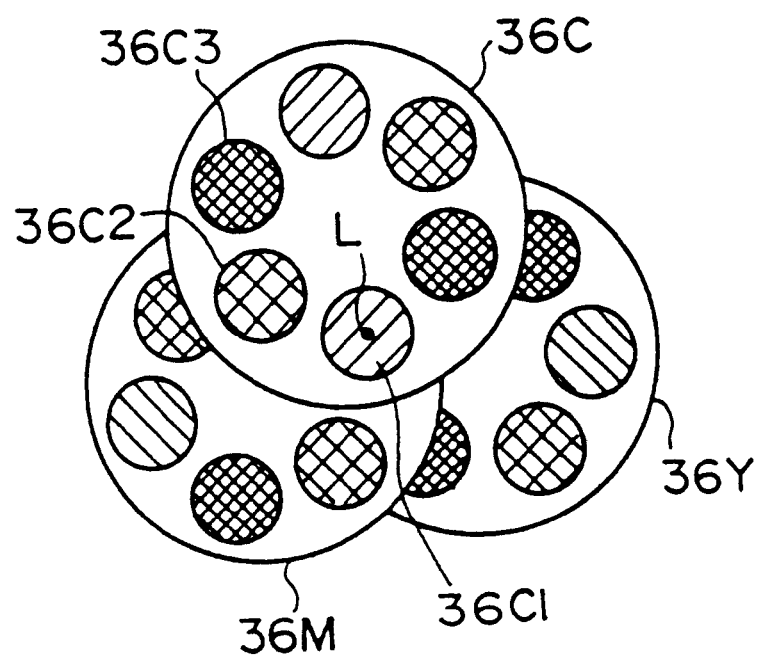
FIG. 9 is a view which shows a modified example of the turret according to the present invention.

Further, the turret is not limited to the above-mentioned turret (see FIG. 4B). As shown in FIG. 9, the combination of a turret 36C for cyan filters which absorb red light, a turret 36M for magenta filters which absorb green light, and a turret 36Y for yellow filters which absorb violet light may also be used. A plurality of cyan filters 36C1, 36C2, and 36C each having a different density are fitted into the turret 36C. The density increases in the order of the cyan filters 36C1, 36C2, and 36C3. The other turrets 36M and 36Y have a similar structure. Further, each of the turrets 36C, 36M, and 36Y is rotatably supported so that the selected filters of the respective turrets are superposed on the optical axis L.

Next, a second embodiment of the present invention will be described. In the second embodiment, description will be given of a modified example of the optical system of the line CCD scanner 14. Components of the line CCD scanner 14 of the present second embodiment which are similar to those of the line CCD scanner 14 of the first embodiment are designated by the same reference numerals, and detailed description thereof will be omitted.

Figure 10A:
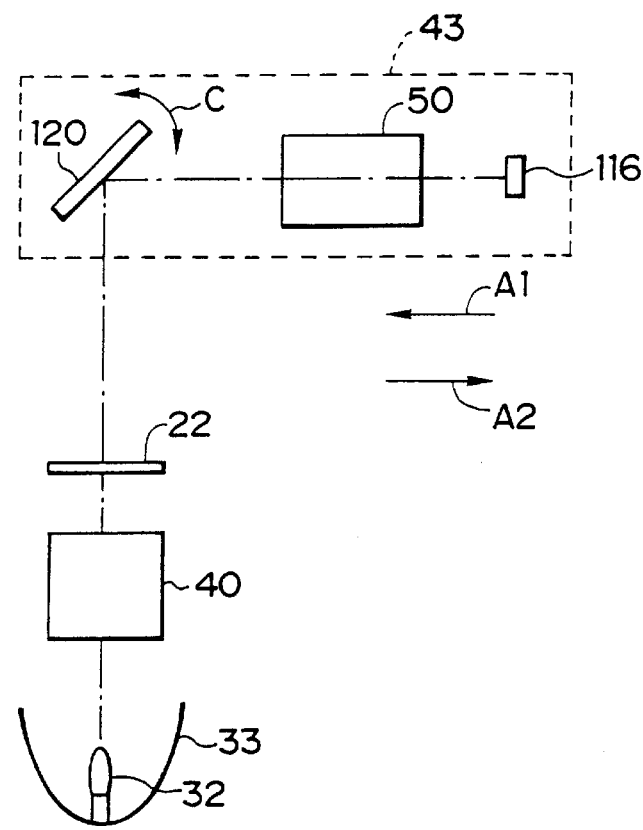
FIG. 10A is a view which shows a principal portion of an optical system of a line CCD scanner in a second embodiment.
Figure 10B:
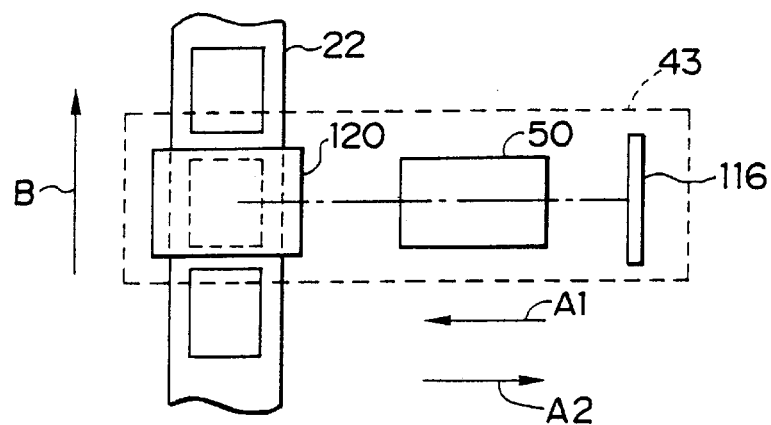
FIG. 10B is a top view of the optical system of the line CCD scanner shown in FIG. 10A.

FIG. 10A shows a principal portion of the line CCD scanner 14, and FIG. 10B is a top view of the structure illustrated in FIG. 10A. As shown in FIGS. 10A and 10B, the reading section 43 includes a mirror 120. The mirror 120 reflects the light transmitted through the photographic film 22 in a direction substantially perpendicular to the direction the photographic film 22 is conveyed. The reflected light reaches the line CCD 116 through the lens unit 50. Further, the light diffusion box 40 makes the light emitted from the lamp 32 into diffused light and irradiates the diffused light on an entire image frame of the photographic film 22.

Moreover, the reading section 43, i.e., the mirror 120, the lens unit 50, and the line CCD 116, can be moved in the directions indicated by arrows A1 and A2. Namely, sub-scan can be effected by moving the reading section 43.

Operation of the second embodiment will be described next.

When the photographic film 22 is conveyed by the film carrier 38 in the direction indicated by arrow B at a predetermined speed and an image frame to be read is conveyed to the reading position, or more specifically, the position where the line at the lowermost portion of the image frame 23 can be read by the line CCD scanner 116 (see FIG. 8), the film carrier 38 stops conveyance of the photographic film 22. Subsequently, the microprocessor 46 of the line CCD scanner 14 operates the reading-section driving motor 67 to move the reading section 43 at a predetermined speed in the direction indicated by arrow A1.

The light emitted from the lamp 32 is made into diffused light by the light diffusion box 40 and irradiated on the entire image frame to be read of the photographic film 22 which is positioned at the reading position. The light irradiated on the image frame is reflected by the mirror 120 in the direction of the lens unit 50 and imaged by the lens unit 50 onto the light-receiving surface of the line CCD 116.

One line of the image is thereby read by the line CCD 116. In this way, while the reading section 43 is moved in the direction indicated by arrow A1 (sub-scan), the image of the image frame 23 is read line by line (main scan) and sequentially outputted to the image processing section 16. When reading of the image frame 23 is finished, the microprocessor 46 reversely rotates the reading-section driving motor 67 so as to move the reading section 43 in the direction indicated by arrow A2 and return the reading section 43 to its original position. Subsequently, the photographic film 22 is conveyed by the film carrier 38 in the direction indicated by arrow B for reading of a subsequent image frame. Thereafter, the reading of the image frames is successively effected in a similar manner while the photographic film 22 is conveyed.

In this way, main scan is effected along the direction of the long sides of the image frame, while sub-scan is effected along the direction of the short sides of the image frame. Therefore, the reading time of image frames can be reduced.

Sub-scan can also be effected in such a manner that the reading section 43 is not moved in the sub-scan direction, and instead, the mirror 120 is rotated in the direction indicated by arrow C in FIG. 10A.

Next, a third embodiment of the present invention will be described. In the third embodiment, description will be given of a modified example of the optical system of the line CCD scanner 14. Components of the line CCD scanner 14 of the present third embodiment which are similar to those of the line CCD scanner 14 of the first embodiment are designated by the same reference numerals, and detailed description thereof will be omitted.

Figure 11A:
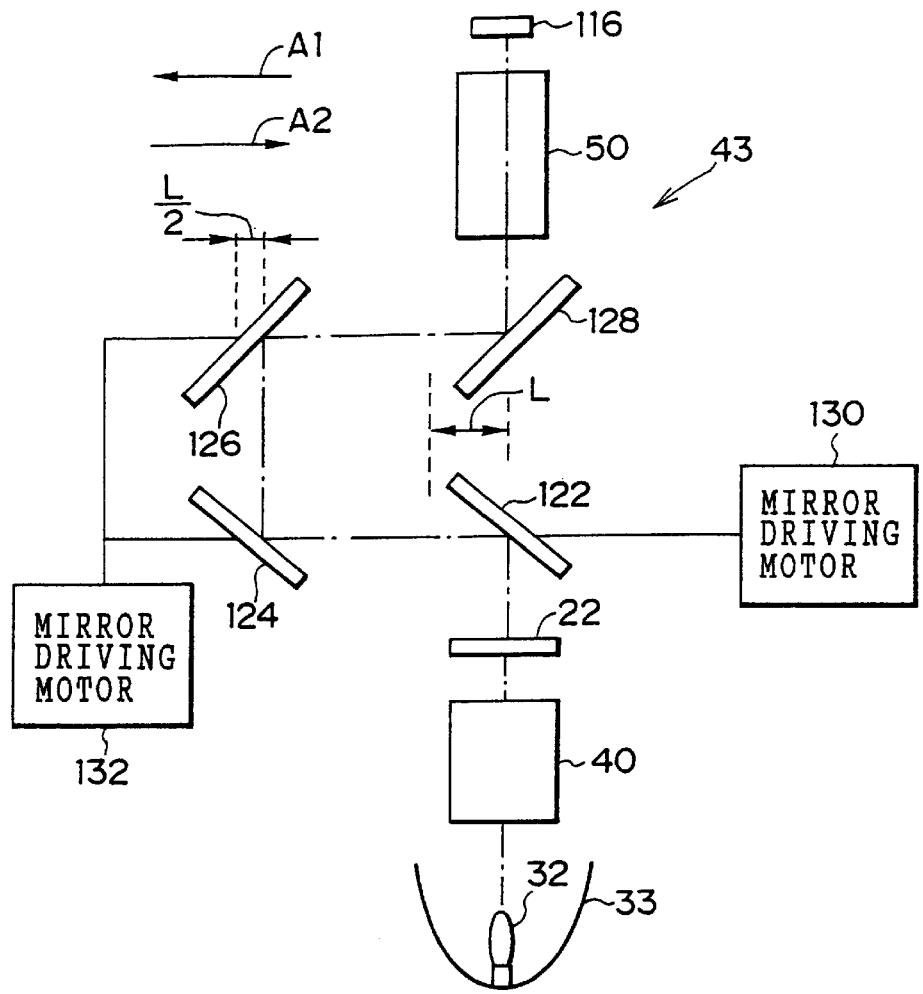
FIG. 11A is a view which shows a principal portion of an optical system of a line CCD scanner in a third embodiment.
Figure 11B:
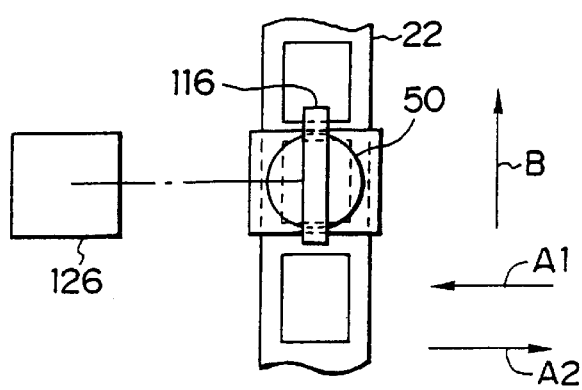
FIG. 11B is a top view of the optical system of the line CCD scanner shown in FIG. 11A.

FIG. 11A shows a principal portion of the line CCD scanner 14, and FIG. 11B is a top view of the structure illustrated in FIG. 11A. As shown in FIG. 11A, the reading section 43 includes four mirrors 122, 124 126, and 128. Further, the mirror 122 is connected to a mirror driving motor 130, while the mirrors 124 and 126 are connected to a mirror driving motor 132. Although not shown in FIGS. 11A and 11B, the mirror driving motors 130 and 132 are connected to the motor driver 48.

The mirror 122 is driven by the mirror driving motor 130 to move in the directions indicated by arrows A1 and A2. Further, the mirrors 124 and 126 are driven simultaneously by the mirror driving motor 132 to move in the directions indicated by arrows A1 and A2. Namely, sub-scan can be effected by driving the mirrors 122, 124, and 126. For example, when the mirror 122 is moved in the direction indicated by arrow A1 by a distance L, the optical path length becomes shorter by the distance L. Therefore, it is necessary to move the mirror 122 in the direction indicated by arrow A1 and simultaneously move the mirrors 124 and 126 in the direction indicated by arrow A1 by a distance L/2. Thus, the moving speed of the mirrors 124 and 126 is half of that of the mirror 122.

Light transmitted through the photographic film 22 is reflected by the mirror 122 in the direction of the mirror 124, i.e., in the direction indicated by arrow A1. The light reflected by the mirror 122 is reflected by the mirror 124 in the direction of the mirror 126. The light reflected by the mirror 124 is reflected by the mirror 126 in the direction of the mirror 128, i.e., in the direction indicated by arrow A2. The light reflected by the mirror 126 is reflected by the mirror 128 in the direction of the lens unit 50. The light reflected by the mirror 128 passes through the lens unit 50 and reaches the line CCD 116. The light diffusion box 40 makes the light emitted from the lamp 32 into diffused light, and the diffused light is irradiated on the entire image frame of the photographic film 22.

Operation of the third embodiment will be described next.

When the photographic film 22 is conveyed by the film carrier 38 in the direction indicated by arrow B at a predetermined speed and an image frame to be read is conveyed to the reading position, more specifically, the position where the line at the lowermost portion of the image frame 23 can be read by the line CCD 116, the film carrier 38 stops conveyance of the photographic film 22. Subsequently, the microprocessor 46 of the line CCD scanner 14 operates the mirror driving motor 130 to move the mirror 122 at a predetermined speed in the direction indicated by arrow A1.

At the same time, the microprocessor 46 operates the mirror driving motor 132 to move the mirrors 124 and 126 in the direction indicated by arrow A2 at a speed which is half of the aforementioned predetermined speed.

In this state, the light emitted from the lamp 32 is made into diffused light by the light diffusion box 40 and irradiated onto the entire image frame to be read of the photographic film 22 which is positioned at the reading position. The light irradiated on the image frame is reflected by the mirrors 122, 124, 126, and 128 in the direction of the lens unit 50 and is imaged by the lens unit 50 onto the light-receiving surface of the line CCD 116.

One line of the image is thereby read by the line CCD 116. In this way, while the mirrors 122, 124, and 126 are moved in the direction indicated by arrow A1 (sub-scan), the image of the image frame 23 is read line by line (main scan) and sequentially outputted to the image processing section 16. When reading of the image frame 23 is finished, the microprocessor 46 reversely rotates of the mirror driving motors 130 and 132 so as to move the mirrors 122, 124 and 126 in the direction indicated by arrow A2 and return the mirrors 122, 124 and 126 to their original positions. Subsequently, the photographic film 22 is conveyed by the film carrier 38 in the direction indicated by arrow B for reading of a subsequent image frame. Thereafter, the reading of the image frames is successively effected in a similar manner while the photographic film 22 is conveyed.

In this way, main scan is effected in the direction of the long sides of the image frame, while sub-scan is effected in the direction of the short sides of the image frame. Therefore, the reading time of image frames can be reduced.

Next, a fourth embodiment of the present invention will be described. In the fourth embodiment, description will be given of the principal portion of the optical system of the line CCD scanner 14 in the case in which an image, which is recorded not on a transparent material such as the photographic film 22 but on a reflective material such as paper, is to be read. Components of the line CCD scanner 14 of the present fourth embodiment which are similar to those of the line CCD scanner 14 of the first embodiment are designated by the same reference numerals, and detailed description thereof will be omitted.

Figure 12:
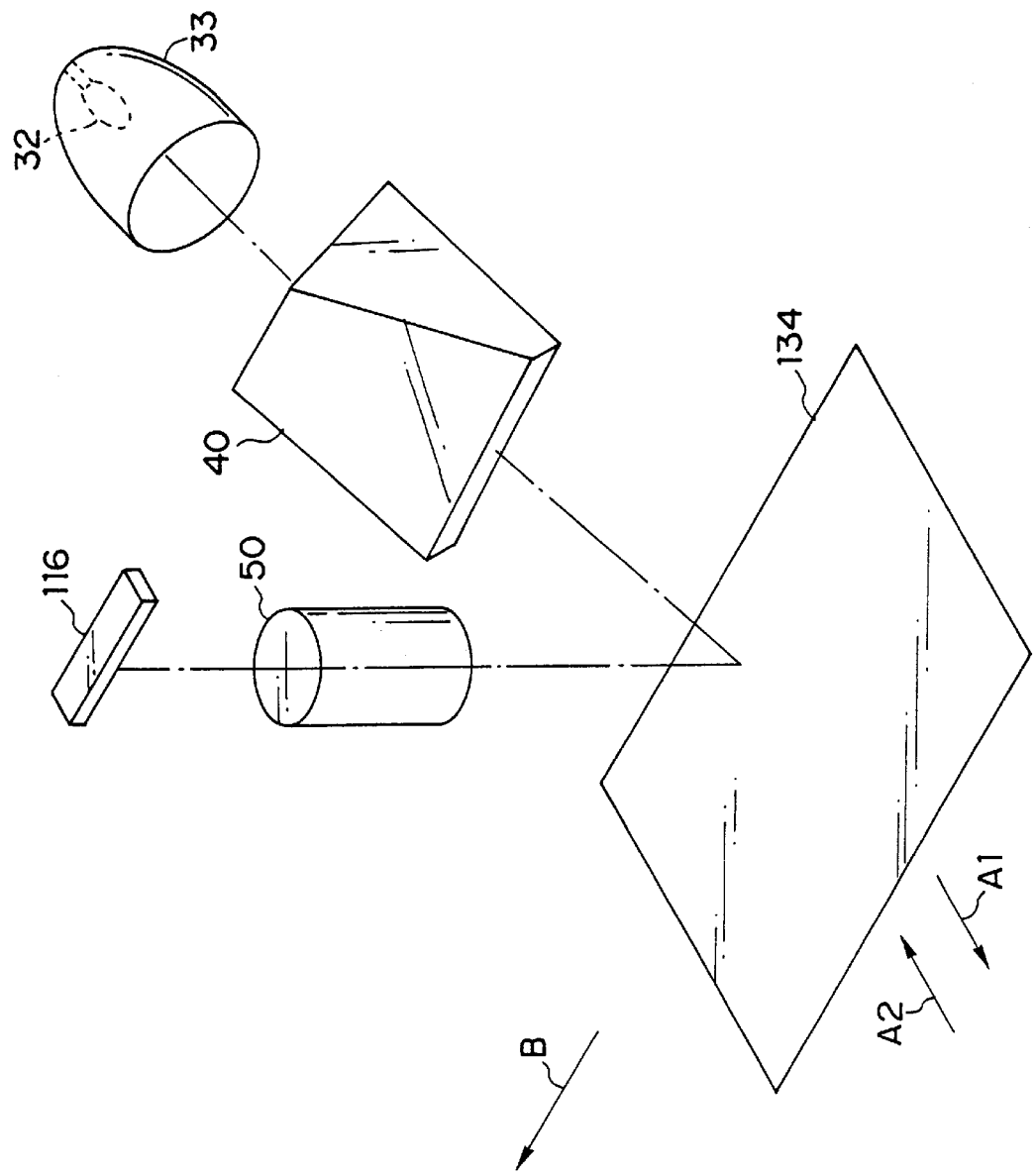
FIG. 12 is a view which shows a principal portion of an optical system of a line CCD scanner in a fourth embodiment.

FIG. 12 shows the principal portion of the line CCD scanner 14 in the fourth embodiment. The only point different from the line CCD scanner 14 in the first embodiment is that, in the present fourth embodiment, the light emitted from the lamp 32 passes through the light diffusion box 40 and is irradiated on a reflective material 134 from a position which is diagonally above the reflective material 134 and at the long side of the reflective material 134. Since the remainder of the line CCD scanner 14 in the present fourth embodiment is the same as the line CCD scanner 14 in the first embodiment, and the operation of these line CCD scanners 14 is the same, description thereof will be omitted.

In this way, even in the case in which an image recorded on the reflective material 134 is read, main scan is effected in the direction of the long sides of the reflective material 134, while sub-scan is effected in the direction of the short sides of the reflective material 134. Therefore, the reading time of the reflective material can be reduced.

The fourth embodiment is not limited to the structure in which the light emitted from the lamp 32 is irradiated on the reflective material 134 from diagonally above. A structure is also possible in which a half mirror is provided between the reflective material 134 and the lens unit 50, and the lamp 32 and the light diffusion box 40 are disposed so that the light emitted from the lamp 32 in the direction indicated by arrow A1 is irradiated on the half mirror. In this case, the light emitted from the lamp 32 passes through the light diffusion box 40 and is incident on the half mirror, and the light incident on the half mirror is reflected in the direction of the reflective material 134. Thereafter, the light reflected by the reflective material 134 passes through the half mirror again and enters the lens unit 50.

Further, if the diffused light emitted from the light diffusion box 40 is not made into slit light, but instead, is irradiated on the entire reflective material 134 from diagonally above, the reflective material 134 can be used in the structure shown in FIG. 10A, FIG. 10B, FIG. 11A, or FIG. 11B. In addition, an image recording material in which are combined both a transparent material and a reflective material, for example, a watermark material, can also be used in such an arrangement.

As described above, in accordance with the present invention, light irradiated on an image recording material is imaged by an imaging lens, and the light imaged by the imaging lens is used for main scan in the longitudinal direction of the image recording material. Further, sub-scan is effected by a sub-scanning means in a direction substantially perpendicular to the direction in which the image recording material is conveyed. Accordingly, the present invention has an excellent effect in that sub-scan time is reduced and reading of an image recording material can be effected at high speed.

What is claimed is:

1. An image reading apparatus comprising:
   a light source for irradiating light onto an image recording material;
   diffusing means for diffusing light emitted from said light source;
   conveying means for conveying said image recording material in a longitudinal direction thereof;
   an imaging lens for imaging light which has been irradiated on said image recording material;
   a reading sensor for effecting main scan, in a longitudinal direction of said image recording material, of light which has been imaged by said imaging lens, said reading sensor comprising a line sensor having an elongate dimension, with the elongate dimension disposed in the longitudinal direction of said image recording material; and
   sub-scanning means for effecting sub-scan in a direction substantially perpendicular to the direction said image recording material is conveyed.

2. An image reading apparatus according to claim 1, wherein said image recording material is one of a transparent material and a reflective material, and when said image recording material is a reflective material, the entirety of the reflective material is irradiated by said diffusing means from diagonally above the reflective material.

3. An image reading apparatus according to claim 1, wherein at said reading sensor, a plurality of light-receiving cells, which receive light imaged by said imaging lens, are provided in the longitudinal direction of said reading sensor, and said reading sensor effects main scan in the longitudinal direction of said image recording material.

4. An image reading apparatus according to claim 1, wherein said sub-scanning means is a moving means which moves said image recording material in a direction substantially perpendicular to the direction said image recording material is conveyed.

5. An image reading apparatus according to claim 1, wherein said sub-scanning means is a moving means which moves at least said reading sensor and said imaging lens in a direction substantially perpendicular to the direction said image recording material is conveyed.

6. An image reading apparatus according to claim 1, further comprising at least one light guiding means provided at the light-entering side of said imaging lens, said light guiding means guiding light irradiated on said image recording material to said imaging lens.

7. An image reading apparatus according to claim 6, wherein said sub-scanning means is a moving means which moves at least one of said reading sensor, said imaging lens, and said light guiding means in a direction substantially perpendicular to the direction said image recording material is conveyed.

8. An image reading apparatus according to claim 6, wherein said sub-scanning means is a moving means which one of rotates and moves said light guiding means.

9. An image reading apparatus according to claim 1, wherein said image recording material is an elongate transparent material having a plurality of image frames, and the long sides of each image frame are along the longitudinal direction of said image recording material.

10. The apparatus according to claim 1, wherein the image recording material is a reflective material, and said diffusing means irradiates the reflective material from diagonally above the reflective material.

11. An image reading apparatus comprising:
    a light source for irradiating light onto an image recording material;
    diffusing means for diffusing light emitted from said light source;
    conveying means for conveying said image recording material in a longitudinal direction thereof;
    an imaging lens for imaging light which has been irradiated on said image recording material;
    a reading sensor for effecting main scan, in a longitudinal direction of said image recording material, of light which has been imaged by said imaging lens; and
    sub-scanning means for effecting sub-scan in a direction substantially perpendicular to the direction said image recording material is conveyed,
    wherein said diffusing means makes light emitted from said light source into slit light which is long along the longitudinal direction of said image recording material, and said sub-scanning means is a moving means which moves at least said reading sensor, said imaging lens, and said diffusing means in a direction substantially perpendicular to the direction said image recording material is conveyed.

12. An image reading apparatus comprising:
    a light source for irradiating light onto an image recording material;
    diffusing means for diffusing light emitted from said light source;
    conveying means for conveying said image recording material in a longitudinal direction thereof;
    an imaging lens for imaging light which has been irradiated on said image recording material;
    a reading sensor for effecting main scan, in a longitudinal direction of said image recording material, of light which has been imaged by said imaging lens; and
    sub-scanning means for effecting sub-scan in a direction substantially perpendicular to the direction said image recording material is conveyed,
    wherein said image recording material is an elongate transparent material having a plurality of image frames, and the long sides of each image frame are along the longitudinal direction of said image recording material, and wherein said reading sensor has a longitudinal direction length which is longer than the long sides of said image frame without extending over adjacent image frames.

13. An image reading apparatus comprising:

a light source for irradiating light onto an image recording material;

diffusing means for diffusing light emitted from said light source;

conveying means for conveying said image recording material in a longitudinal direction thereof;

an imaging lens for imaging light which has been irradiated on said image recording material;

a reading sensor for effecting main scan, in a longitudinal direction of said image recording material, of light which has been imaged by said imaging lens; and sub-scanning means for effecting sub-scan in a direction substantially perpendicular to the direction said image recording material is conveyed, wherein said image recording material is an elongate transparent material having a plurality of image frames, and the long sides of each image frame are along the longitudinal direction of said image recording material, and wherein when said reading sensor has effected main scan on one line of said image frame along a longitudinal direction of said image frame, said sub-scanning means moves said transparent material in a direction substantially perpendicular to the direction said transparent material is conveyed such that said reading sensor can effect main scan on a subsequent one line of said image frame in a longitudinal direction of said image frame.

14. An image reading apparatus comprising:

a light source for irradiating light onto an image recording material;

diffusing means for diffusing light emitted from said light source;

conveying means for conveying said image recording material in a longitudinal direction thereof;

an imaging lens for imaging light which has been irradiated on said image recording material;

a reading sensor for effecting main scan, in a longitudinal direction of said image recording material, of light which has been imaged by said imaging lens; and sub-scanning means for effecting sub-scan in a direction substantially perpendicular to the direction said image recording material is conveyed, wherein said image recording material is an elongate transparent material having a plurality of image frames, and the long sides of each image frame are along the longitudinal direction of said image recording material, and wherein when main scan is finished for the entirety of said image frame along the longitudinal direction of said image frame, said sub-scanning means moves said transparent material in the direction opposite to a direction substantially perpendicular to the direction said transparent material is conveyed so as to return said transparent material to its original conveyance position, such that said conveying means moves said transparent material in the longitudinal direction of said transparent material and an adjacent image frame can be scanned.

15. An image reading apparatus comprising:

a light source for irradiating light onto an image recording material;

diffusing means for diffusing light emitted from said light source;

conveying means for conveying said image recording material in a longitudinal direction thereof;

an imaging lens for imaging light which has been irradiated on said image recording material;

a reading sensor for effecting main scan, in a longitudinal direction of said image recording material, of light which has been imaged by said imaging lens; and sub-scanning means for effecting sub-scan in a direction substantially perpendicular to the direction said image recording material is conveyed, wherein said image recording material is an elongate transparent material having a plurality of image frames, and the long sides of each image frame are along the longitudinal direction of said image recording material, and wherein the closer a portion of said diffusing means is to said transparent material, the longer said portion of said diffusing means is in the conveying direction of said transparent material and the shorter said portion of said diffusing means is in the direction orthogonal to the conveying direction of said transparent material.

16. An image reading apparatus comprising:

a light source for irradiating light on an elongate transparent material which allows transmission of light;

shaping means for shaping light emitted from said light source into slit light which is made long in a longitudinal direction of said transparent material;

conveying means for conveying said transparent material in a longitudinal direction of said transparent material;

an imaging lens for imaging light which has been shaped by said shaping means and transmitted through said transparent material;

a reading sensor for effecting main scan in a longitudinal direction of said slit light, said reading sensor including a plurality of light-receiving cells provided along the longitudinal direction of said slit light for receiving light imaged by said imaging lens; and sub-scan means for effecting sub-scan in a direction substantially perpendicular to a direction said transparent material is conveyed.

* * * * *